_United States Patent Office_

2,708,193
Patented May 10, 1955

2,708,193
WATER-SOLUBLE CHROMIUM-CONTAINING AZO DYESTUFFS

Helmut Pfitzner and Otto Kaufmann, Ludwigshafen (Rhine), Germany, assignors to Badische Anilin- & Soda-Fabrik Aktiengesellschaft, Ludwigshafen (Rhine), Germany No Drawing. Application June 26, 1951,
Serial No. 233,702
Claims priority, application Germany June 29, 1950
13 Claims. (Cl. 260—147)

This invention relates to water-soluble chromium-containing dyestuffs.

It has already been proposed to treat chromed azo dyestuffs containing sulfonic acid groups with solutions of organic compounds which are themselves capable of forming complex chromium compounds but which are not dyestuffs. In this way the tinctorial and fastness properties, and also the solubility and shade of the initial dyestuff, are changed. It has also been proposed to carry out the chroming of chromable dyestuffs in the presence of salicylic acids substituted by aliphatic radicals having at least 3 carbon atoms in order to obtain chromium-containing dyestuffs which are readily soluble in organic solvents.

We have now found that chromed azo and azomethine dyestuffs containing one atom of chromium to one molecule of dyestuff which are free from sulfonic acid groups, and which are from difficultly soluble to insoluble in water can be rendered water-soluble by treating them preferably in the presence of an alkali metal salt, e. g. sodium acetate, with solutions of organic compounds which are themselves capable of forming complex chromium compounds but which are not dyestuffs and do not contain long-chain alkyl radicals. In many cases it is not necessary to start from the chromium compounds of the said dyestuffs, but the dyestuff free from chromium may be treated in the presence of the said organic compounds with agents supplying chromium; the chromium compounds of the added organic compounds may also serve as the agents supplying chromium.

As initial dyestuffs there may be mentioned for example azo dyestuffs or azomethine dyestuffs which contain groups capable of combining with metal, such as hydroxyl, carboxylic or amino groups, in o- and o'-position to the azo or azomethine bridge, or their complex chromium compounds containing one atom of chromium. Dyestuffs which contain a hydroxyl group and a carboxylic group in o-position to each other at any position in the molecule, or their complex chromium compounds, may also be used. In all cases the absence of sulfonic acid groups is essential. Among organic compounds which are capable of forming complex chromium compounds and which may also be employed for the chroming in the form of complex chromium compounds there may be mentioned in particular aromatic compounds containing hydroxyl and/or carboxylic or sulfonic acid groups, such as 2-hydroxy-benzoic acid, 1.2-dihydroxybenzene, ortho- or peri-dihydroxynaphthalenes, ortho-hydroxynaphthoic acids, phthalic acid and its various derivatives, and also compounds such as ortho-nitrosonaphthols, 8-hydroxyquinoline, pyridine sulfonic or carboxylic acids, oxalic acid, tartaric acid, citric acid, malic acid, nitrilo-triacetic acid, ethylenediamino-tetracetic acid, polyglycols or ethanolamines.

The water-soluble chromium-containing dyestuffs obtainable according to the present invention may be used for dyeing wool, silk, leather, casein wool and other synthetic fibers, especially of animal fiber character and in many cases they have the great advantage over the chromium-containing dyestuffs hitherto known that they will go on to wool from neutral or weakly acid baths and thereby yield dyeings of high fastness, in particular of great fastness to light.

The following examples will further illustrate this invention but the invention is not restricted to these examples. The parts are by weight.

Example 1

21 parts of the chromium-containing monoazo dyestuff from diazotized 1-hydroxy-2-amino-5-nitrobenzene and 1-phenyl-3-methyl-pyrazolone-(5), which contains one atom of chromium for each molecule of dyestuff, are boiled 3 hours under reflux in 500 parts of ethanol with 7 parts of 2-hydroxybenzoic acid in the presence of 14 parts of sodium acetate. The ethanol is then evaporated. The water soluble dyestuff obtained dyes wool bluish-red shades from a weakly acid bath.

The dyestuff corresponds to the following probable formula:

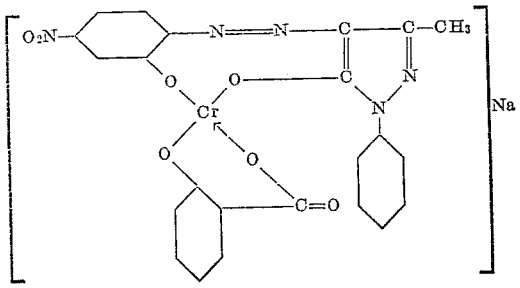

Example 2

A mixture of 21 parts of the chromium-containing monoazo dyestuff from diazotized 1-hydroxy-2-amino-5-nitrobenzene and 1-phenyl-3-methyl-pyrazolone-(5), which contains one atom of chromium for each molecule of dyestuff, 14 parts of 1.2-dihydroxybenzene-3.5-disulfonic acid amide, 14 parts of sodium acetate and 500 parts of water is heated to boiling for 3 hours while stirring. The dyestuff thus gradually goes into solution almost completely. After cooling the reaction mixture is filtered and the new dyestuff is precipitated in the pure form from the filtrate by the addition of sodium chloride. It has a very good solubility in water and dyes wool bluish-red shades from a weakly acid bath.

The dyestuff corresponds to the following probable formula:

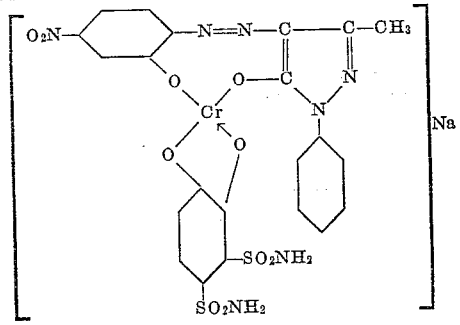

Example 3

20 parts of the chromium-containing monoazo dyestuff from diazotized 1-hydroxy-2-amino-5-nitrobenzene and 2-hydroxynaphthalene, which contains one atom of chromium for each molecule of dyestuff, are heated to boiling for 3 hours in 500 parts of ethanol with 14 parts of 1-nitroso-2-hydroxynaphthalene-6-sulfonic acid in the presence of 14 parts of sodium acetate. After distilling off the ethanol, there is obtained as a residue a water-soluble dyestuff which dyes wool blue-grey shades.

The dyestuff corresponds to the following probable formula:

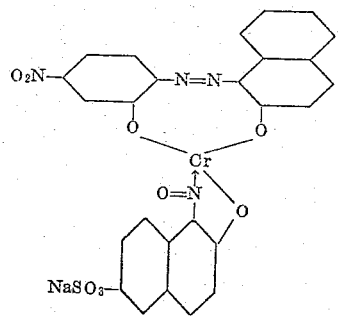

*Example 4*

A mixture of 17 parts of the chromium-containing azomethine dyestuff from 1-hydroxy-2-amino-4-nitrobenzene and 2-hydroxybenzaldehyde, which contains one atom of chromium for each molecule of dyestuff, 11 parts of 2-hydroxybenzoic-acid-5-sulfonic acid amide, 14 parts of sodium acetate and 500 parts of ethanol is heated to boiling for 3 hours while stirring. After distilling off the ethanol, a water-soluble dyestuff is obtained which dies wool yellow shades from a neutral bath.

The dyestuff corresponds to the following probable formula:

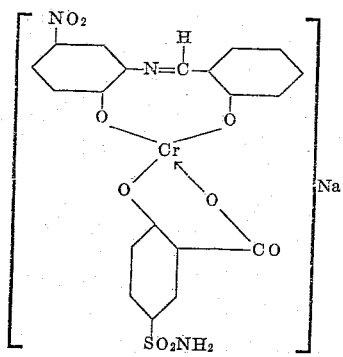

*Example 5*

A mixture of 20 parts of the chromium-containing monoazo dyestuff from diazotized 1-hydroxy-2-amino-5-nitrobenzene and 2-aminonaphthalene, which contains one atom of chromium for each molecule of dyestuff, 11 parts of 2-hydroxybenzoic-acid-5-sulfonic acid amide, 14 parts of sodium acetate and 500 parts of ethanol is heated to boiling while stirring until the dyestuff has become water-soluble. After distilling off the ethanol, a water-soluble dyestuff is obtained which dyes wool beautiful green shades from a neutral to weakly acid bath.

The dyestuff corresponds to the following probable formula:

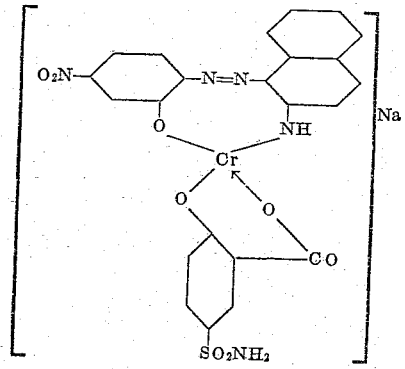

*Example 6*

21 parts of the chromium-containing monazo dyestuff from diazotized 2-aminobenzoic acid and 1-phenyl-3-methylpyrazolone-(5), which contains one atom of chromium for each molecule of dyestuff, are heated to boiling in 500 parts of ethanol for 3 hours with 17 parts of 2-hydroxybenzoic-acid-5-sulfonic-acid-di-(hydroxyethyl)-amide in the presence of 14 parts of sodium acetate. After distilling off the ethanol, there is obtained as a residue a dyestuff of good solubility in water which dyes wool yellow shades.

The dyestuff corresponds to the following probable formula:

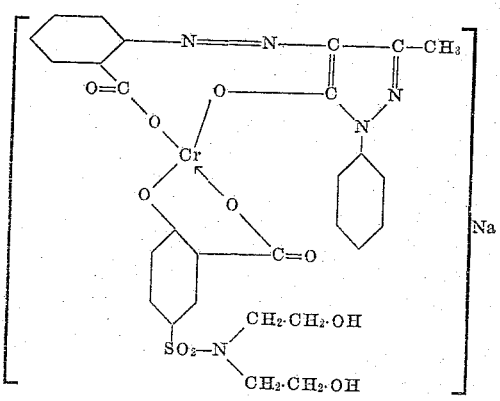

*Example 7*

A mixture of 20 parts of the chromium-containing monoazo dyestuff from diazotized 1-amino-3-nitrobenzene and 2-hydroxybenzoic acid, which contains one atom of chromium for each molecule of dyestuff, 16 parts of 1.8-dihydroxynaphthalene-3.6-disulfonic acid, 28 parts of sodium acetate and 500 parts of ethanol is heated to boiling for 3 hours. It is then filtered and washed with ethanol, the residue being a dyestuff having very good solubility in water which dyes wool yellow shades.

The dyestuff corresponds to the following probable formula:

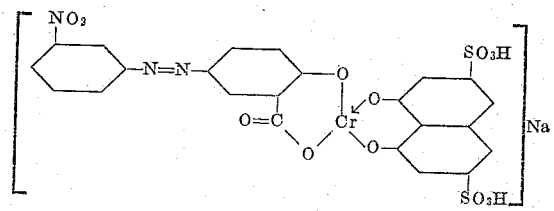

*Example 8*

A mixture of 21 parts of the chromium-containing monoazo dyestuff from diazotized 1-hydroxy-2-amino-4-nitrobenzene and acetoacetylaminobenzene, which contains one atom of chromium for each molecule of dyestuff, 15 parts of 2-hydroxybenzoic-acid-5-sulfonic-acid-phenylamide, 14 parts of sodium acetate and 500 parts of ethanol is heated to boiling for 3 hours while stirring. After distilling off the ethanol, a yellow dyestuff is obtained which has very good solubility in water and which dyes wool yellow shades.

The dyestuff corresponds to the following probable formula:

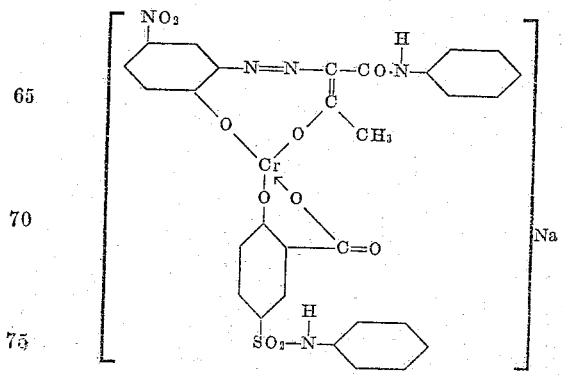

Example 9

A mixture of 17 parts of the monoazo dyestuff from diazotized 1-hydroxy-2-amino-5-nitrobenzene and 1-phenyl-3-methyl-pyrazolone-(5), 40 parts of tri-3,5-sulf-amido-pyrocatechuic-chromic acid, 14 parts of sodium acetate and 1000 parts of water is heated in a closed vessel for 2 hours at 130° to 135° C. The reaction mixture is then filtered and the new dyestuff is separated from the filtrate in a pure form by the addition of sodium chloride. It has very good solubility in water and dyes wool bluish-red shades from a weakly acid bath.

The new dyestuff with the desired solubility in water is also obtained in the same way by the direct action of 1.2-dihydroxybenzene-3.5-disulfonic acid amide and chromium chloride in the presence of sodium acetate on the above-mentioned monoazo compound.

The dyestuff corresponds to the following probable formula:

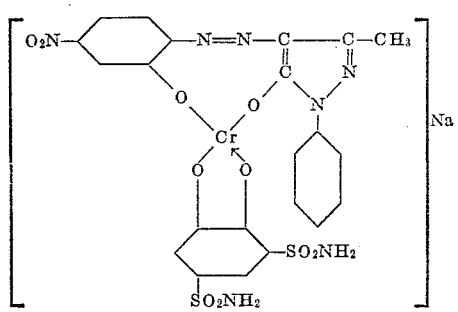

Example 10

A mixture of 21 parts of a chromium-containing monoazo dyestuff from diazotized 2-hydroxybenzoic acid and 1-phenyl-3-methyl-pyrazolone-(5), which contains one atom of chromium for each molecule of dyestuff, 16 parts of 2-hydroxybenzoic-acid-5-sulfonic-acid- phenylamide, 14 parts of sodium acetate and 500 parts of ethanol is heated to boiling for 3 hours while stirring. The ethanol is then evaporated. The residue is dissolved in 2 per cent aqueous solution of sodium carbonate, the solution obtained filtered and the new dyestuff precipitated in pure form from the filtrate by the addition of sodium chloride. It has a very good solubility in water and dyes wool yellow shades from a weakly acid bath.

The new dyestuff corresponds to the probable formula:

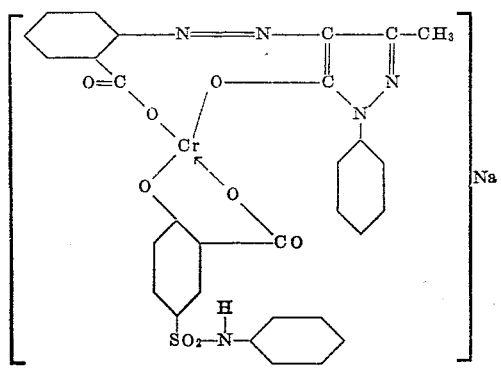

Example 11

A mixture of 21 parts of a chromium-containing monoazo dyestuff from diazotized 1-hydroxy-2-amino-4-nitrobenzene and 1-phenyl-3-methyl-pyrazolone-(5), which contains one atom of chromium for each molecule of dyestuff, 17 parts of 2-hydroxy benzoic-acid-5-sulfonic-acid-(p-methyl-phenyl)-amide, 14 parts of sodium acetate and 500 parts of ethanol is heated to boiling for 3 hours while stirring. After evaporating the ethanol there is obtained a water-soluble residue, which dyes wool orange shades from a weakly acid bath.

The new dyestuff corresponds to the probable formula:

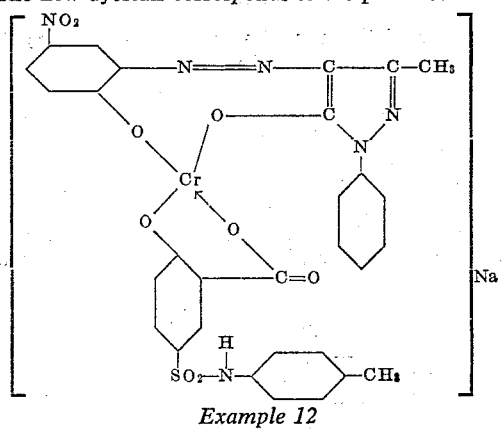

Example 12

A mixture of 21 parts of a chromium-containing monoazo dyestuff from diazotized 1-hydroxy-2-amino-5-nitrobenzene and 1-phenyl-3-methyl-pyrazolone-(5), which contains one atom of chromium for each molecule of dyestuff, 16 parts of 2-hydroxy-benzoic-acid-5-sulfonic-acid-phenylamide, 14 parts of sodium acetate and 500 parts of ethanol is heated to boiling for 3 hours while stirring. After cooling the mixture is filtered and the residue is dissolved in a 2 per cent aqueous solution of sodium carbonate. From this solution the new dyestuff is precipitated in pure form by the addition of sodium chloride. It has a very good solubility in water and dyes wool from a weakly acid bath red shades.

The new dyestuff corresponds to the probable formula:

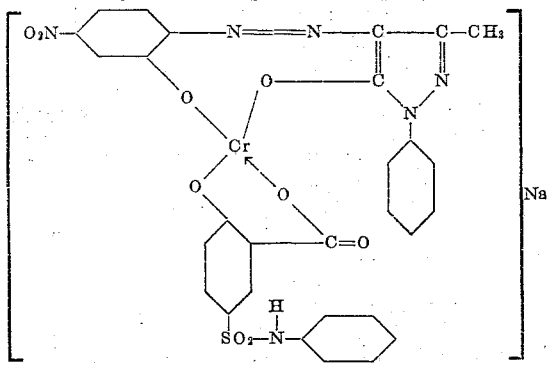

Example 13

A mixture of 14 parts of a chromium-containing monoazo dyestuff from 1-hydroxy-2-amino-5-nitrobenzene and 1-hydroxy-4-methylbenzene, which contains one atom of chromium for each molecule of dyestuff, 12 parts of 2-hydroxybenzoic-acid-sulfonic-acid-phenylamide, 14 parts of sodium acetate and 500 parts of water is heated to boiling for 2 hours while stirring. After cooling the mixture is filtered and the new dyestuff is precipitated in pure form from the filtrate by the addition of sodium chloride. The new water-soluble dyestuff dyes wool from a very weakly acid bath violet shades. The new dyestuff corresponds to the probable formula:

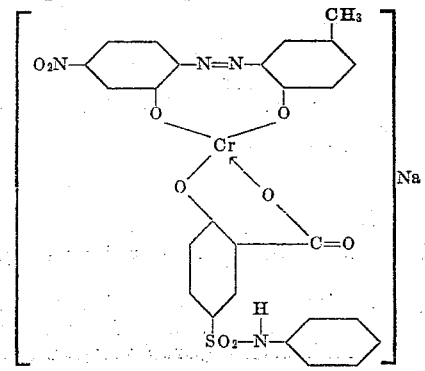

Example 14

A mixture of 10 parts of a chromium-containing dyestuff from diazotized 1-hydroxy-2-amino-3-bromo-5-nitrobenzene and 1-hydroxynaphthalene, which contains one atom of chromium for each molecule of dyestuff, 6 parts of 2-hydroxy-benzoic-acid-5-sulfonic-acid-amide, 6 parts of sodium acetate and 500 parts of ethanol is heated to boiling for 2 hours while stirring. After distilling off the ethanol a water-soluble residue is obtained which dyes wool blue shades from a very weakly acid bath. The new dyestuff corresponds to the probable formula:

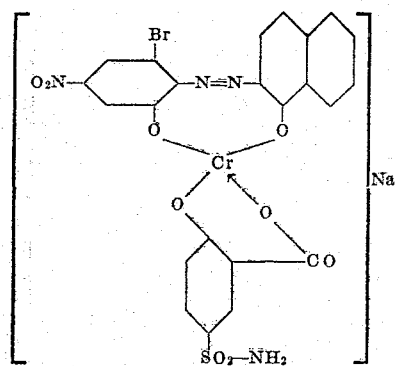

What we claim is:

1. A process for the production of a water-soluble chromium-containing dyestuff which comprises heating a chromed monoazo dyestuff containing one atom of chromium for one molecule of the dyestuff which is free from sulfonic acid groups and which is from difficultly soluble to insoluble in water, in the presence of a diluent with a chelating compound selected from the group consisting of ortho-dihydroxybenzene, 1,8-dihydroxynaphthalene, 1,2-nitrosonaphthol, salicyclic acid and the corresponding mono- and di-sulfonic acids, sulfonic acid amides, sulfonic acid phenyl amides, sulfonic acid tolylamides and sulfonic acid di-(hydroxyethyl) amides.

2. A process for the production of a water-soluble chromium-containing dyestuff which comprises heating a chromed monoazo dyestuff containing one atom of chromium for one molecule of the dyestuff which is free from sulfonic acid groups and which is from difficultly soluble to insoluble in water, in the presence of a diluent from the group consisting of ethanol and water, and in the presence of at least one equivalent of an alkali metal acetate, with about one molar proportion of a chelating compound selected from the group consisting of ortho-dihydroxybenzene, 1,8-dihydroxynaphthalene, 1,2-nitrosonaphthol, salicyclic acid and the corresponding mono- and di-sulfonic acids, sulfonic acid amides, sulfonic acid phenyl amides, sulfonic acid tolylamides and sulfonic acid di-(hydroxyethyl) amides.

3. A process for the production of a water-soluble chromium containing monoazo dyestuff which comprises heating a chromed monoazo dyestuff containing one atom of chromium for one molecule of dyestuff which is free from sulfonic acid groups and which is from difficultly soluble to insoluble in water in the presence of ethanol and an alkali metal acetate with an ortho-dihydroxybenzene sulfonic acid amide.

4. A process for the production of a water-soluble chromium containing monoazo dyestuff which comprises heating a dyestuff from diazotized 1-hydroxy-2-amino-5-nitrobenzene and 1-phenyl-3-methyl-pyrazolone-(5) containing one atom of chromium for one molecule of dyestuff in the presence of ethanol and an alkali metal acetate with 2-hydroxy-benzoic-acid-5-sulfonic-acid-phenylamide.

5. A process for the production of a water-soluble chromium containing monoazo dystuff which comprises heating a chromed monoazo dyestuff containing one atom of chromium for one molecule of dyestuff which is free from sulfonic acid groups and which is from difficultly soluble to insoluble in water in the presence of ethanol and an alkali metal acetate with a 2-hydroxy-benzoic acid sulfonic acid-amide.

6. A chromium containing dystuff containing chelated to each chromium atom one molecule of the group consisting of o,o'-dihydroxy- and o-carboxy-o'-hydroxy-monoazo dyestuffs which are free from sulfonic acid groups and one molecule of a 2-hydroxy-benzoic acid sulfonic acid amide.

7. A chromium containing dyestuff containing chelated to each chromium atom one molecule of the group consisting of o,o'-dihydroxy- and o-carboxy-o'-hydroxy-monoazo dyestuffs which are free from sulfonic acid groups and one molecule of another chelating organic compound selected from the group consisting of the mono- and di-sulfonic acid amides, sulfonic acid phenyl amides, sulfonic acid tolylamides and sulfonic acid di-(hydroxyethyl) amides of salicyclic acid.

8. A dyestuff of the general formula

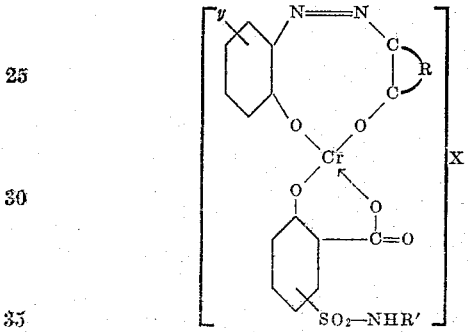

wherein R stands for the remaining part of a cyclic coupling component selected from the class consisting of phenols, naphthols and phenylmethylpyrazolones, R' for a radical of the group consisting of hydrogen, phenyl and tolyl, y for a radical of the group consisting of hydrogen, halogen and nitro, and X for an alkali metal.

9. The dyestuff of the formula

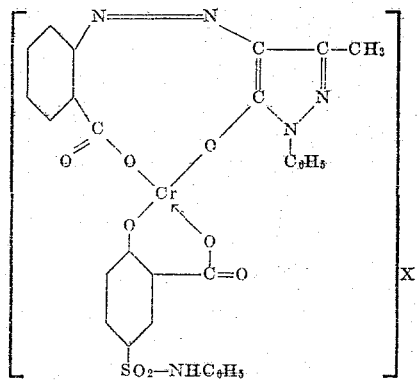

wherein X stands for an alkali metal.

10. The dyestuff of the formula

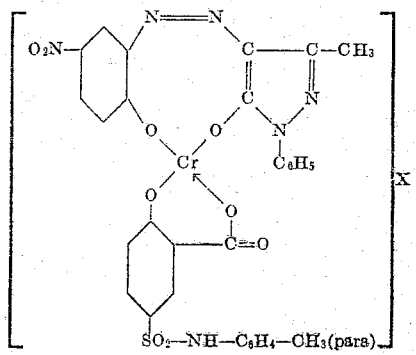

wherein X stands for an alkali metal.

11. The dyestuff of the formula

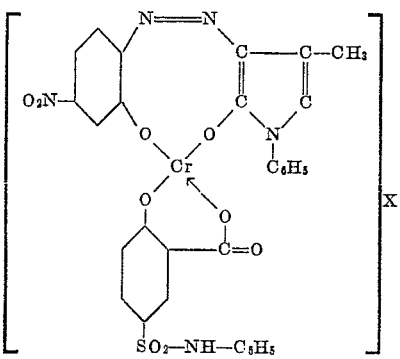

wherein X stands for an alkali metal.

12. The dyestuff of the formula

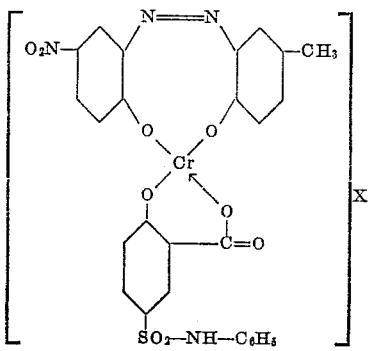

wherein X stands for an alkali metal.

13. The dyestuff of the formula

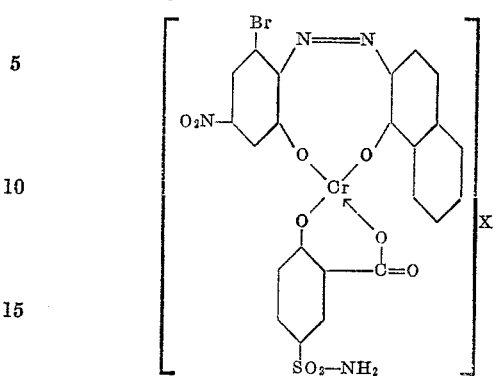

wherein X stands for an alkali metal.

References Cited in the file of this patent
UNITED STATES PATENTS

| | | |
|---|---|---|
| 1,843,376 | Stusser | Feb. 2, 1932 |
| 1,995,553 | Stusser | Mar. 26, 1935 |
| 2,120,741 | Graenacher et al. | June 14, 1938 |
| 2,120,743 | Graenacher et al. | June 14, 1938 |
| 2,170,262 | Graenacher et al. | Aug. 22, 1939 |
| 2,417,735 | Conzetti et al | Mar. 18, 1947 |
| 2,537,098 | Slifkin et al. | Jan. 9, 1951 |